(12) United States Patent
Zeng et al.

(10) Patent No.: US 10,437,560 B2
(45) Date of Patent: Oct. 8, 2019

(54) PHASE RETRIEVAL USING COORDINATE DESCENT TECHNIQUES

(71) Applicant: City University of Hong Kong, Kowloon (HK)

(72) Inventors: Wen-Jun Zeng, Shek Kip Mei (HK); Hing Cheung So, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/344,279

(22) Filed: Nov. 4, 2016

(65) Prior Publication Data
US 2018/0129630 A1    May 10, 2018

(51) Int. Cl.
   *G06F 17/11* (2006.01)
   *G06F 7/64* (2006.01)
   *G06F 7/544* (2006.01)

(52) U.S. Cl.
   CPC .............. *G06F 7/64* (2013.01); *G06F 7/5446* (2013.01); *G06F 17/11* (2013.01)

(58) Field of Classification Search
   CPC ...................................................... G06F 17/11
   See application file for complete search history.

(56) References Cited

U.S. PATENT DOCUMENTS

2016/0204963 A1* 7/2016 Abdoli .............. H04L 25/03286
                                                         375/267

OTHER PUBLICATIONS

Waldspurger et al., "Phase Recovery, Maxcut and Complex Semidefinite Programming", pp. 1-27, 2013.*
Wright, "Coordinate Descent Algorithms", pp. 3-34, 2015.*
R. Gerchberg, W. Saxton, "A Practical Algorithm for the Determination of Phase from Image and Diffraction Plane Pictures," *Optik*, vol. 35, pp. 237-246, 1972.
E. Candes, X. LI, M. Soltanolkotabi, "Phase Retrieval via Wirtinger Flow: Theory and Algorithms," *IEEE Trans. Inf. Theory*, vol. 61, No. 4, pp. 1985-2007, Apr. 2015.

(Continued)

*Primary Examiner* — Chuong D Ngo
(74) *Attorney, Agent, or Firm* — Norton Rose Fulbright US LLP

(57) ABSTRACT

Coordinate descent is applied to recover a signal-of-interest from only magnitude information. In doing so, a single unknown value is solved at each iteration, while all other variables are held constant. As a result, only minimization of a univariate quartic polynomial is required, which is efficiently achieved by finding the closed-form roots of a cubic polynomial. Cyclic, randomized, and/or a greedy coordinate descent technique can be used. Each coordinate descent technique globally converges to a stationary point of the nonconvex problem, and specifically, the randomized coordinate descent technique locally converges to the global minimum and attains exact recovery of the signal-of-interest at a geometric rate with high probability when the sample size is sufficiently large. The cyclic and randomized coordinate descent techniques can also be modified via minimization of the $l_1$-regularized quartic polynomial for phase retrieval of sparse signals-of-interest, i.e., those signals with only a few nonzero elements.

16 Claims, 7 Drawing Sheets

STEP 1001: EXPRESS MAGNITUDE INFORMATION FOR A SIGNAL-OF-INTEREST AS AN OBJECTIVE FUNCTION, $f(\bar{z})$ WHERE $f(\bar{z})$ CAN BE EXPRESSED IN THE FORM OF A MULTIVARIATE QUARTIC POLYNOMIAL STEP 1002: SELECT A COORDINATE INDEX, $i_k$, ACCORDING TO ONE OR MORE PREDEFINED COORDINATE DESCENT RULES STEP 1003: ITERATIVELY MINIMIZE ONE VARIABLE COMPONENT OF THE MULTIVARIATE QUARTIC POLYNOMIAL WHILE EVERY OTHER VARIABLE COMPONENT OF THE MULTIVARIATE QUARTIC POLYNOMIAL IS HELD AT A CONSTANT VALUE

(56) References Cited

OTHER PUBLICATIONS

E. Candes, T. Strohmer, V. Voroninski, "PhaseLift: Exact and Stable Signal Recovery from Magnitude Measurements via Convex Programming," *Commun. Pure Appl. Math.*, vol. 66, No. 8, pp. 1241-1274, 2013.
I. Waldspurger, A. d'Aspremont, S. Mallat, "Phase recovery, MaxCut and complex semidefinite programming." *Math. Program., Ser. A*, vol. 149, No. 1, pp. 47-81, Feb. 2015.
Y. Shechtman, Y. Eldar, O. Cohen, H. Chapman, J. Miao, M. Segev, "Phase Retrieval with Application to Optical Imsging," *IEEE Signal Process. Mag.*, vol. 32, No. 3, pp. 87-109, May 2015.
O. Shalvi, E. Weinstein, "Super-Exponential Methods for Blind Deconvolution," *IEEE Trans. Inf. Theory*, vol. 39, No. 2, pp. 504-519, May 1993.

\* cited by examiner

PHASE RETRIEVAL USING COORDINATE DESCENT TECHNIQUES

TECHNICAL FIELD

The present disclosure generally relates to phase retrieval in signals-of-interest. Specifically, the present disclosure relates to recovering a signal-of-interest from its magnitude information using coordinate descent techniques.

BACKGROUND OF THE INVENTION

Phase retrieval generally refers to the process of recovering a complete signal-of-interest from only intensity (i.e., magnitude) information relating to that signal. Phase retrieval applies to a number of important fields, including astronomy, computational biology, crystallography, digital communications, electron microscopy, neutron radiography, and optical imaging.

The purpose of phase retrieval is to recover a signal using the magnitude-square observations of its linear transformation. In fact, phase retrieval corresponds to a difficult nonconvex optimization problem where minimizing a multivariate quartic (i.e., fourth-order) polynomial is required. This problem is generally "NP-hard," where NP-hardness (i.e., non-deterministic polynomial-time hardness), in computational complexity theory, is a class of problems that are, informally, "at least as hard as the hardest problems in NP." More precisely, a problem, H, is NP-hard when every problem, L, in NP can be reduced in polynomial time to H. That is, a given solution for problem L can be verified to be a solution for problem H in polynomial time. As a consequence, finding a polynomial algorithm to solve any NP-hard problem would give polynomial algorithms for all the problems in NP, which is unlikely as many of them are considered hard.

Traditional phase retrieval techniques involve restoring a time-domain signal from its power spectrum observations, although the Fourier transform can be generalized to any linear mappings. Conventional approaches include the Gerchherg-Saxton (GS) technique, the Wirtinger Flow (WF) technique, the PhaseLift technique, and the PhaseCut technique. The GS and WF techniques directly deal with the nonconvex problem formulation by adopting alternating minimization and gradient descent, respectively. On the other hand, the PhaseLift technique and the PhaseCut technique relax the nonconvex problem to a convex program. However, these approaches have the drawbacks of requiring lengthy observations, a relatively large number of iterations, and/or high computational complexity.

BRIEF SUMMARY OF THE INVENTION

In view of the foregoing, embodiments described herein provide for recovering a complete signal-of-interest from only intensity (or magnitude) information relating to the signal by applying coordinate descent techniques. According to embodiments, a single unknown value is solved at each iteration, while all other variables are held constant. As a result, only minimization of a univariate quartic polynomial is required to fully recover the signal-of-interest, which is efficiently achieved by finding the closed-form roots of a cubic polynomial.

Described embodiments comprise using a cyclic, randomized, and/or greedy coordinate descent technique to minimize the multivariate quartic polynomial. Each of these coordinate descent techniques globally converges to a stationary point of the nonconvex problem, and specifically, the randomized coordinate descent technique locally converges to the global minimum and attains exact recovery of the signal-of-interest at a geometric rate with high probability when the sample size is sufficiently large. The cyclic and randomized coordinate descent techniques can also be modified by minimizing the $l_1$-regularized quartic polynomial for phase retrieval of sparse signals-of-interest, i.e., those signals with only a few nonzero elements.

Further, application of each of the three (3) coordinate descent techniques to blind equalization in digital communications is described herein. As discussed, described embodiments are superior to known approaches in terms of computational simplicity and/or recovery performance, even when the number of signal measurements is relatively small.

The foregoing has outlined rather broadly the features and technical advantages of the present invention in order that the detailed description of the invention that follows can be better understood. Additional features and advantages of the invention will be described hereinafter that form the subject of the claims of the invention. It should be appreciated by those skilled in the art that the concepts and specific embodiments disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further strengths and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
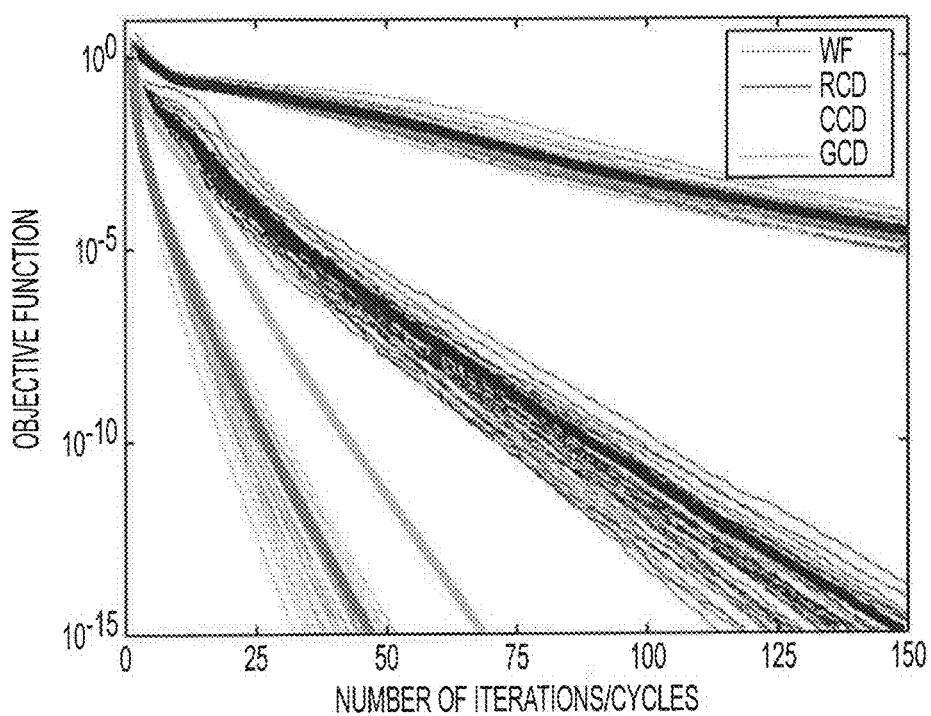
FIG. 1 shows the normalized reduction of objective function versus number of iterations/cycles at SNR=20 dB according to one or more embodiments.

Described embodiments provide for recovering a complete signal-of-interest, i.e., the signal's phase information and magnitude information, from only intensity measurements of the signal. Doing so is generally referred to herein as phase retrieval. Conventionally, phase retrieval involves restoring a time-domain signal from power spectrum observations of the signal-of-interest, although the Fourier transform can be generalized to any linear mappings. Nevertheless, phase retrieval is a nonconvex optimization problem where minimizing a multivariate fourth-order polynomial is required. This problem is generally considered to be "NP-hard," where NP-hardness (i.e., nondeterministic polynomial-time hardness), in computational complexity theory, is a class of problems that are, informally, "at least as hard as the hardest problems in NP." More precisely, a problem, H, is NP-hard when every problem, L, in NP can be reduced in polynomial time to H. That is, a given solution for problem L can be verified to be a solution for problem H in polynomial time. As a consequence, finding a polynomial algorithm to solve any NP-hard problem would give polynomial algorithms for all the problems in NP, which is unlikely as many of them are considered hard.

According to the inventive concepts described herein, coordinate descent techniques are utilized to solve the foregoing problems more efficiently than previously known approaches. That is, a single unknown is solved at each iteration while all other variables are held constant. As a result, only minimization of a univariate quartic polynomial is required, which is efficiently achieved by determining the closed-form roots of a cubic polynomial. Embodiments can utilize one or more of three (3) coordinate descent techniques, referred to herein as (1) cyclic, (2) randomized, and (3) greedy coordinate descent techniques. As discussed, these three (3) coordinate descent techniques globally converge to a stationary point of the nonconvex problem, and specifically, the randomized coordinate descent technique locally converges to the global minimum and attains exact recovery of phase information at a geometric rate with high probability when the sample size is sufficiently large.

Further, the cyclic and randomized coordinate descent techniques can be modified by minimizing the $l_1$-regularized quartic polynomial for phase retrieval of sparse signals, i.e., signals with only a few nonzero elements. Also, a specific application of the three (3) coordinate descent techniques to blind equalization in digital communications is described herein. Experimental evaluations reveal that described embodiments have been demonstrated to be superior to known approaches in terms of computational simplicity and/or recovery performance.

To better illustrate the inventive concepts described herein, general mathematical principles of phase retrieval are first discussed. Mathematically, the problem of phase retrieval is to find the complex-valued signal, $x \in \mathbb{C}^N$, from M phaseless observations, $b_m \in \mathbb{R}$. This is shown by equation (1):

$$b_m = |a_m^H x|^2 + v_m, \quad m=1, \ldots, M \qquad \text{equation (1)}$$

where $a_m \in \mathbb{C}^N$ are known sampling vectors, $v_m \in \mathbb{R}$ are additive zero-mean noise terms, and M>N. It should be appreciated that in optical imaging applications, $a_m$ is the discrete Fourier transform vector. If $b_m = |a_m^H x| + v_m$, it can be converted to $b_m^2$. The x can be recovered up to a global phase, $\phi \in [0, 2\pi)$, because $e^{j\phi}x$ is also a solution. Adopting the least squares criterion, x is determined from equation (2):

$$\min_{x \in \mathbb{C}^N} f(x) := \sum_{m=1}^{M} \left( |a_m^H x|^2 - b_m \right)^2. \qquad \text{equation (2)}$$

In terms of real-valued representations, equation (2) is equivalent to the expression shown at equation (3):

$$\min_{\bar{x} \in \mathbb{R}^{2N}} f(\bar{x}) := \sum_{m=1}^{M} (q_m(\bar{x}) - b_m)^2. \qquad \text{equation (3)}$$

where $$\bar{x} = \begin{bmatrix} \text{Re}(x) \\ \text{Im}(x) \end{bmatrix} \qquad \text{equation (4)}$$

and $$q_m(\bar{x}) = \bar{x}^T \bar{A}_m \bar{x}, \qquad (5)$$

$$\bar{A}_m = \begin{bmatrix} \text{Re}(x) & -\text{Im}(A_m) \\ \text{Im}(x) & \text{Re}(A_m) \end{bmatrix} \in \mathbb{R}^{2N \times 2N},$$

$$A_m = a_m a_m^H \in \mathbb{C}^{N \times N}.$$

The objective function $f(\bar{x})$ is a multivariate quartic polynomial of $\bar{x} = [\bar{x}_1 \ldots \bar{x}_{2N}]^T$, implying that its minimization is generally "NP-hard." Again, NP-hardness (i.e., nondeterministic polynomial-time hardness) is a class of problems that are, informally, "at least as hard as the hardest problems in NP." More precisely, a problem, H, is NP-hard when every problem, L, in NP can be reduced in polynomial time to H. That is, a given solution for problem L can be verified to be a solution for problem H in polynomial time. As a consequence, finding a polynomial algorithm to solve any NP-hard problem would give polynomial algorithms for all the problems in NP, which is unlikely as many of them are considered hard.

According to described embodiments, the coordinate update strategy is exploited to minimize $f(\bar{x})$. Coordinate descent is an iterative procedure that successively minimizes the objective function along coordinate directions. The result of the kth iteration can be denoted as $\bar{x}^k = [\bar{x}_1^k \ldots \bar{x}_{2N}^k]^T$. In the kth iteration, $f(\bar{x}^k)$ is minimized with respect to the $i_k$ th ($i_k \in \{1, \ldots, 2N\}$) variable while keeping the remaining $2N-1$ $\{\bar{x}_i^k\}_{i \neq i_k}$ constant. This is equivalent to performing a one-dimensional search along the $i_k$th coordinate, which can be expressed as:

$$\alpha_k = \underset{\alpha \in \mathbb{R}}{\arg\min} f(\bar{x}^k + \alpha e_{i_k}) \qquad \text{equation (6)}$$

where $e_{i_k}$ is the unit vector with the $i_k$th entry being one and all other entries being zero. From the foregoing, $\bar{x}$ is updated by:

$$\bar{x}^{k+1} = \bar{x}^k + \alpha_k e_{i_k} \qquad \text{equation (7)}$$

which implies that only the $i_k$th component is adjusted:

$$\bar{x}_{i_k}^{k+1} \leftarrow \bar{x}_{i_k}^k + \alpha_k \qquad \text{equation (8)}$$

while all other components remain constant. Since $\bar{x}^k$ is known, $f(\bar{x}^k + \alpha e_{i_k})$ is a univariate function of $\alpha$. Therefore, equation (6) is a one-dimensional minimization problem.

A coordinate descent solution is shown in the following:

---

Algorithm 1 CD for Phase Retrieval

Initialization: Determine $\bar{x}^0 \in \mathbb{R}^{2N}$ using the spectral method, referenced herein:
for k = 0, 1 . . . , do
  Choose index $i_k \in \{1, \ldots, 2N\}$:

$$\alpha_k = \arg\min_{\alpha \in \mathbb{R}} f(\bar{x}^k + \alpha e_{i_k});$$

$$\bar{x}_{i_k}^{k+1} \leftarrow x_{i_k}^k + a_k;$$

Stop if $f(\bar{x}^k) - f(\bar{x}^{k+1}) < \epsilon$ is satisfied, where $\epsilon > 0$ is a small tolerance parameter.
end for

---

According to the inventive concepts, prior to presenting a solution to equation (6), one or more of three (3) selection rules for the coordinate index, $i_k$, are followed by the phase retrieval system described herein. According to one embodiment, a cyclic rule is followed where $i_k$ is first assigned a value of 1, then 2, and so forth through 2N. These steps are then repeated, starting with $i_k=1$ again. That is, $i_k$ is cyclically assigned a value from $\{1, \ldots, 2N\}$. Accordingly, one cycle corresponds to 2N iterations. According to another embodiment, a random rule is followed where $i_k$ is randomly selected from $\{1, \ldots, 2N\}$ with equal probability. According to yet another embodiment, a greedy rule is followed where $i_k$ is chosen as $$i_k = \arg\max_i |\nabla f_i(\bar{x}^k)|, \quad \text{equation (9)}$$

$$\nabla f_i(\bar{x}^k) = \frac{\partial f(\bar{x}^k)}{\partial \bar{x}_i^k}.$$

That is, in following the greedy rule the coordinate with the largest absolute value of the partial derivative is chosen. Therefore, in following the greedy rule, the phase retrieval system must compute the full gradient at each iteration, which is not required in following the cyclic and random rules. The three (3) coordinate descent techniques: cyclic, random, and greedy rules are referred to as CCD, RCD, and GCD, respectively. Also, experimental evaluations show that the GCD converges faster than CCD and RCD at the expense of the extra full gradient calculation.

Next, the closed-form solution for equation (6) can be derived. For notational simplicity, the superscript and subscript k in equation (6) are omitted. That is, given $\bar{x}$ for any current iteration and the search direction $e_i$, equation (10) can be followed:

$$\min_{\alpha \in \mathbb{R}} \varphi(\alpha) := f(\bar{x} + \alpha e_i). \quad \text{equation (10)}$$

Employing equation (3), $\varphi(\alpha)$ is expressed as $$\varphi(\alpha) = \sum_{m=1}^M (q_m(\bar{x} + \alpha e_i) - b_m)^2 \quad \text{equation (11)}$$

where the mth term is $$\varphi_m(\alpha) = (q_m(\bar{x} + \alpha e_i) - b_m)^2. \quad \text{equation (12)}$$

Expanding the quadratic function in equation (12) yields:

$$q_m(\bar{x} + \alpha e_i) = \alpha^2 e_i^T \bar{A}_m e_i + 2\alpha e_i^T \bar{A}_m \bar{x} + \bar{x}^T \bar{A}_m \bar{x} \triangleq c_{2,i}^m \alpha^2 + c_{1,i}^m \alpha + c_0^m \quad \text{equation (13)}$$

where $c_{2,i}^m$, $c_{1,i}^m$ and $c_0^m$ are the coefficients of the univariate quadratic polynomial. Note that $c_0^m$ has no relation with i. According to equation (5), the coefficient of the quadratic term can be simplified to:

$$c_{2,i}^m = e_i^T \bar{A}_m e_i = [\bar{A}_m]_{i,i} = \begin{cases} |[a_m]_i|^2, & i = 1, \ldots, N \\ |[a_m]_{i-N}|^2, & i = N+1, \ldots, 2N \end{cases} \quad \text{equation (14)}$$

where $[A]_{i,i}$ and $[\alpha]_i$ represent the (i, i) entry of A and ith element of $\alpha$, respectively. It is also revealed from equation (5) that $$\bar{A}_m \bar{x} = \begin{bmatrix} \text{Re}(A_m x) \\ \text{Im}(A_m x) \end{bmatrix} = \begin{bmatrix} \text{Re}((a_m^H x)a_m) \\ \text{Im}((a_m^H x)a_m) \end{bmatrix}. \quad \text{equation (15)}$$

Therefore, the coefficient of the linear term in equation (13) is computed as $$c_{1,i}^m = 2e_i^T \bar{A}_m \bar{x} = \begin{cases} \text{Re}((a_m^H x)[a_m]_i), & i = 1, \ldots, N \\ \text{Im}((a_m^H x)[a_m]_{i-N}), & i = N+1, \ldots, 2N \end{cases}. \quad \text{equation (16)}$$

The constant term is $$c_0^m = \bar{x}^T \bar{A}_m \bar{x} = x^H A_m x = |a_m^H x|^2. \quad \text{equation (17)}$$

Since $q_m(\bar{x} + \alpha e_i)$ is quadratic, $\varphi_m(\alpha)$ of equation (12) is a univariate quartic polynomial of $\alpha$. Inserting equation (13) into equation (12) results in:

$$\varphi_m(\alpha) = d_{4,i}^m \alpha^4 + d_{3,i}^m \alpha^3 + d_{2,i}^m \alpha^2 + d_{1,i}^m \alpha + d_0^m \quad \text{equation (18)}$$

where $$d_{4,i}^m = (c_{2,i}^m)^2$$

$$d_{3,i}^m = 2c_{2,i}^m c_{1,i}^m$$

$$d_{2,i}^m = (c_{1,i}^m)^2 + 2c_{2,i}^m(c_0^m - b_m)$$

$$d_{1,i}^m = 2c_{1,i}^m(c_0^m - b_m)$$

$$d_0^m = (c_0^m - b_m)^2. \quad \text{equation (19)}$$

Note that $d_0^m$ is not related to i.

Recalling $\varphi(\alpha) = \sum_{m=1}^M \varphi_m(\alpha)$, it is clear that the coefficients of the quartic polynomial $$\varphi(\alpha) = d_{4,i}\alpha^4 + d_{3,i}\alpha^3 + d_{2,i}\alpha^2 + d_{1,i}\alpha + d_0 \quad \text{equation (20)}$$

are the sum of those of $\{\varphi_m(\alpha)\}_{m=1}^M$:

$$d_0 = \sum_{m=1}^{M} d_0^m, \; d_{j,i} = \sum_{m=1}^{M} d_{j,i}^m, \; j = 1, \ldots, 4. \quad \text{equation (21)}$$

The minimum point of $\varphi(\alpha)$ is obtained by setting its derivative to zero:

$$\varphi'(\alpha) = 4d_{4,i}\alpha^3 + 3d_{3,i}\alpha^2 + 2d_{2,i}\alpha + d_{1,i} = 0. \quad \text{equation (22)}$$

Equation (22) refers to finding the roots of a univariate cubic polynomial, which is easy and fast because there is a closed form solution. Due to the real-valued coefficients of the cubic polynomial, there are only two possible cases on the roots. The first case is that equation (22) has a real root and a pair of complex conjugate roots. In this case, the minimizer is the unique real root because the optimal solution of a real-valued problem must be real. The second case is that equation (22) has three real roots. Then the optimal a is the real root associated with the minimum objective. Once the coefficients of equation (22) are determined, the complexity of calculating the roots of a cubic polynomial is merely $\mathcal{O}(1)$.

In view of the foregoing, the complexity requirement of the coordinate descent techniques is now examined according to embodiments described herein. The most significant computational cost at each iteration is calculating the coefficients $\{d_{j,i}\}_{j=1}^{4}$, or equivalently, computing and $c_{2,i}^m$, $m_{1,i}^m$, and $c_0^m$, $m=1, \ldots M$, because $\{d_{j,i}\}_{j=1}^{4}$ can be easily calculated from $c_{2,i}^m$, $c_{1,i}^m$, and $c_0^m$ according to equation (19) and equation (21). From equation (14), $c_{2,i}^m$ is the squared modulus of $[a_m]_i$ and can be pre-computed in advance before iteration, which requires $\mathcal{O}(M)$ multiplications for calculating all M coefficients $\{c_{2,i}^m\}_{m=1}^{M}$. According to equation (16) and equation (17), $\{a_m^H x\}_{m=1}^{M}$ must be computed to obtain $\{c_{1,i}^m\}_{m=1}^{M}$ and $\{c_0^m\}_{m=1}^{M}$. This involves a matrix-vector multiplication Ax, where the mth row of the matrix A is $a_m^H$, that is:

$$A = \begin{bmatrix} a_1^H \\ \vdots \\ a_M^H \end{bmatrix} \in \mathbb{C}^{M \times N}. \quad \text{equation (23)}$$

At first glance, the matrix-vector multiplication requires a complexity of $\mathcal{O}(MN)$. However, this complexity can be reduced to $\mathcal{O}(M)$ per iteration for the coordinate descent technique. By observing equation (7), it is determined that only a single element changes between two consecutive iterations. Specifically, this is seen from:

$$x^{k+1} - x^k = (x_j^{k+1} - x_j^k)e_j, \; j = \begin{cases} i_k, & \text{if } j \le N \\ i_k - N, & \text{otherwise} \end{cases} \quad \text{equation (24)}$$

which yields $$Ax^{k+1} = Ax^k + (x_j^{k+1} - x_j^k)A_{:,j} \quad \text{equation (25)}$$

where $A_{:,j}$ represents the jth column of A. It is only required to compute $Ax^0$ before an iteration. Afterward, the matrix-vector product can be efficiently updated from that of the previous iteration by an efficient computation of a scalar-vector multiplication, $(x_j^{k+1} - x_j^k)A_{:,j}$, which merely requires $\mathcal{O}(M)$ operations.

In sum, the complexity of CCD and RCD is on the order of $\mathcal{O}(M)$ per iteration. Therefore, the complexity in 2N iterations, for a cycle in which CCD is followed, is the same as that of the WF using full gradient descent. While for GCD, an extra cost for computing the full gradient is needed, which results in a complexity of $\mathcal{O}(MN)$.

Further, as previously mentioned, the three (3) coordinate descent techniques converge to a stationary point from any initial value, and the RCD converges to the global minimum and achieves exact retrieval with high probability provided that the sample size is large enough.

According to embodiments described herein, the foregoing concepts can also be utilized to more efficiently retrieve phase values of sparse signals. If x is sparse, then the real-valued $\bar{x}$ is also sparse. The following $l_1$-regularization, which is commonly used in compressed sensing, for sparse phase retrieval is adopted:

$$\min_{\bar{x} \in \mathbb{R}^{2N}} g(\bar{x}) := \sum_{m=1}^{M} (\bar{x}^T \bar{A}_m \bar{x} - b_m)^2 + \tau \|\bar{x}\|_1 \quad \text{equation (26)}$$

where $\|\bar{x}\|_1 = \Sigma_i |\bar{x}_i|$ is the $l_1$-norm, $\tau > 0$ is the regularization factor, and $g(\bar{x}) = f(\bar{x}) + \tau \|\bar{x}\|_1$. As there is no gradient for equation (26), the GCD cannot be implemented because it requires a gradient for index selection. Therefore, only CCD and RCD are discussed for the $l_1$-regularization, and they are referred to as $l_1$-CCD and $l_1$-RCD, respectively.

The steps of the coordinate descent technique for solving equation (26) are similar to those in shown above for recovery general signals. The only difference is that an $l_1$-norm term is added to the scaler minimization problem of equation (10), which is shown as $$\min_{\alpha \in \mathbb{R}} \{\varphi(\alpha) + \tau \|\bar{x} + \alpha e_i\|_1\}. \quad \text{equation (27)}$$

By ignoring the terms independent to $\alpha$, equation (27) is equivalent to $$\min_{\alpha \in \mathbb{R}} \{\varphi(\alpha) + \tau |\alpha + \bar{x}_i|\}. \quad \text{equation (28)}$$

Making a change of variable $\beta = \alpha + \bar{x}_i$, substituting $\alpha = \beta - \bar{x}_i$ into equation (20), and ignoring the irrelevant components, we obtain an equivalent scalar minimization problem $$\min_{\beta \in \mathbb{R}} \psi(\beta) := u_4 \beta^4 + u_3 \beta^3 + u_2 \beta^2 + u_1 \beta + \tau |\beta| \quad \text{equation (29)}$$

where the coefficients of the quartic polynomial $\{u_j\}_{j=1}^{4}$ are calculated as $$u_4 = d_{4,i}$$

$$u_3 = d_{3,i} - 4\bar{x}_i d_{4,i}$$

$$u_2 = d_{2,i} - 3\bar{x}_i d_{3,i} + 6\bar{x}_i^2 d_{4,i}$$

$$u_1 = d_{1,i} - 2\bar{x}_i d_{2,i} + 3\bar{x}_i^2 d_{3,i} - 4\bar{x}_i^3 d_{4,i}. \quad \text{equation (30)}$$

Although $\psi(\beta)$ is non-smooth due to the absolute term, the closed-form solution of its minimum can still be derived. The minimizer of $\psi(\beta)$ is evaluated in two intervals, namely, $[0, \infty)$ and $(-\infty, 0)$. Next, the set $S^+$ containing the stationary points of ψ(β) in the interval [0, ∞) is defined. That is, $S^+$ is the set of real positive roots of the cubic equation:

$$4u_4\beta^3 + 3u_3\beta^2 + u_2\beta + (u_1+\tau) = 0, \beta \geq 0. \quad \text{equation (31)}$$

The $S^+$ can include zero (0) elements, or can include one (1) or three (3) elements since the cubic equation of (31) may have zero (0), one (1), or three (3) real positive roots. Similarly, $S^-$ is the set that contains the stationary points of ψ(β) in (−∞, 0), that is, the real negative roots of $$4u_4\beta^3 + 3u_3\beta^2 + 2u_2\beta + (u_1-\tau) = 0, \beta < 0. \quad \text{equation (32)}$$

Again, $S^-$ can include zero (0) elements, or can include one (1) or three (3) elements. The minimizer of ψ(β) in β ∈[0, ∞) must be the boundary, i.e., 0, or one (1) element of $S^+$. The minimizer in (−∞, 0) must be an element of $S^-$. In sum, the minimizer of equation (29) is limited to the set {0 ∪ $S^+$ ∪ $S^-$}, which includes a maximum of seven (7) elements, i.e., $$\beta^* = \arg\min_\beta \psi(\beta), \beta \in \{0 \cup S^+ \cup S^-\}. \quad \text{equation (33)}$$

Therefore, ψ(β) must be evaluated over a set of, at most, seven (7) elements only, whose computation is straightforward and not computationally intensive. The coordinate of the $l_1$-regularized coordinate descent technique is updated as $\bar{x}_{i_k}^{k+1} \leftarrow \beta^*$. If $S^+ \cup S^- = \emptyset$, then $\bar{x}_{i_k}^{k+1} = \beta^* = 0$, which makes the solution sparse.

As discussed, certain embodiments can be applied to several different fields, including blind equalization in a wireless communication system. To further illustrate the inventive concepts, these embodiments, as applied blind equalization in a wireless communication system, as described herein. Consider a communication system with discrete-time complex baseband signal model:

$$r(n) = s(n) * h(n) + v(n) \quad \text{equation (34)}$$

where r(n) is the received signal, s(n) is the transmitted data symbol, h(n) is the channel impulse response, v(n) is the additive white noise, and * denotes convolution. The received signal is significantly distorted due to the inter-symbol interference (ISI) induced by the propagation channel.

Blind equalization aims at recovering the transmitted symbols without knowing the channel response. If the equalizer is defined with P coefficients $w = [w_0 \ldots w_{P-1}]^T$ and $r_n = [r(n) \ldots r(n-P+1)]^T$, the equalizer output is $$y(n) = \sum_{i=0}^{P-1} w_i^* r(n-i) = w^H r_n. \quad \text{equation (35)}$$

As many modulated signals in communication, such as phase shift keying (PSK), frequency modulation (FM), and phase modulation (PM), are of constant modulus, the constant modulus criterion is applied to obtain the equalizer:

$$\min_w \sum_n \left(|w^H r_n|^2 - \kappa\right)^2, \text{where} \quad \text{equation (36)}$$

$$\kappa = \frac{\mathbb{E}[|s(n)|^4]}{\mathbb{E}[|s(n)|^2]} \quad \text{equation (37)}$$

is called the dispersion constant. It is obvious that the problem of equation (36) has the same form as the phase retrieval of equation (2). Both of them involve multivariate quartic polynomials. The only difference between phase retrieval and blind equalization is that the decision variable of the former is the unknown signal x while that of the latter is the equalizer w. Therefore, the WF and coordinate descent methods can be applied to solve the blind equalization problem of equation (36). By defining the composite channel-equalizer response as v=(n)=h(n)*w(n), the quantified ISI, which is expressed as $$ISI = \frac{\sum_n |v(n)|^2 - \max_n |v(n)|^2}{\max_n |v(n)|^2} \quad \text{equation (38)}$$

reflects the equalization quality. From the foregoing, smaller values of ISI imply better equalization. Further, all methods use the same initial value obtained from the spectral method. The measurement vectors satisfy a complex standard i.i.d Gaussian distribution.

The convergence behavior of the three (3) coordinate descent techniques is now discussed. The signal x and noise $v_m$ in equation (1) are i.i.d. Gaussian. In experimental evaluations, the following parameters were set: N=64 and M=6N. The results of WF are included for comparison. Note that it is fair to compare 2N iterations (one cycle) for the coordinate descent technique with one WF iteration because the computational complexity of the CCD and RCD per cycle is the same as the WF per iteration. The GCD has a higher complexity for every 2N iterations than WF, CCD, and RCD.

Figure 2:
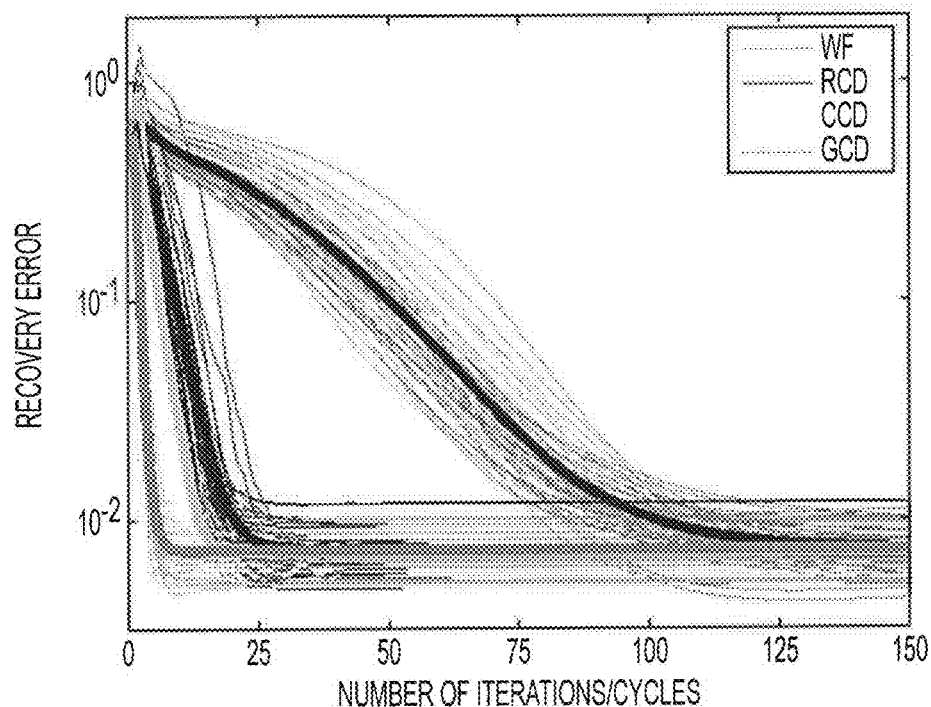
FIG. 2 shows relative recovery error versus number of iterations/cycles at SNR=20 dB according to one or more embodiments.

Two quantities are plotted to evaluate the convergence rate. The first quantity is the reduction of the objective function normalized with respect to $\|b\|^2$:

$$\frac{f(\bar{x}^k) - f(\bar{x}^*)}{\|b\|^2}, b = [b_1 \ldots b_M]^T \quad \text{equation (39)}$$

where $\bar{x}^*$ denotes the optimal solution. The second quantity is the relative recovery error:

$$\frac{\|(\bar{x}^k) - T_{\phi_k}(\bar{x}^*)\|^2}{\|\bar{x}^*\|^2} \quad \text{equation (40)}$$

where $T_{\phi_k}(\bar{x}^*)$ is extracted from $\|x^k - e^{j\phi_k}x^*\|$ has the minimum value, which reflects the convergence speed to the original signal. The signal-to-noise ratio (SNR) in equation (1) is defined as $$SNR = \frac{E[\|b\|^2]}{M\sigma_v^2} \quad \text{equation (41)}$$

where $\sigma_v^2$ is the variance of FIGS. 1 and 2 show the normalized objective reduction and recovery error, respectively, at SNR=20 dB. Fifty (50) independent trials were performed while the averaged results are also plotted with thick lines. It can be clearly seen that the three coordinate descent techniques converge faster than the previously known WF technique. As seen, among the observed techniques, the convergence speed of the GCD is the fastest.

Statistical Performance

For purposes of discussing statistical performance, the experimental settings are the same as those discussed above, except M and SNR vary. The performance of GS method is also examined. The empirical probability of success and normalized mean square error (NMSE), which is the mean of the relative recovery error in equation (40), are used to measure the statistical performance. In this case, all results are averaged over two hundred (200) independent trials. In the absence of noise, if the relative recovery error of a phase retrieval scheme is smaller than $10^{-5}$, it is considered a successful exact recovery.

Figure 3:
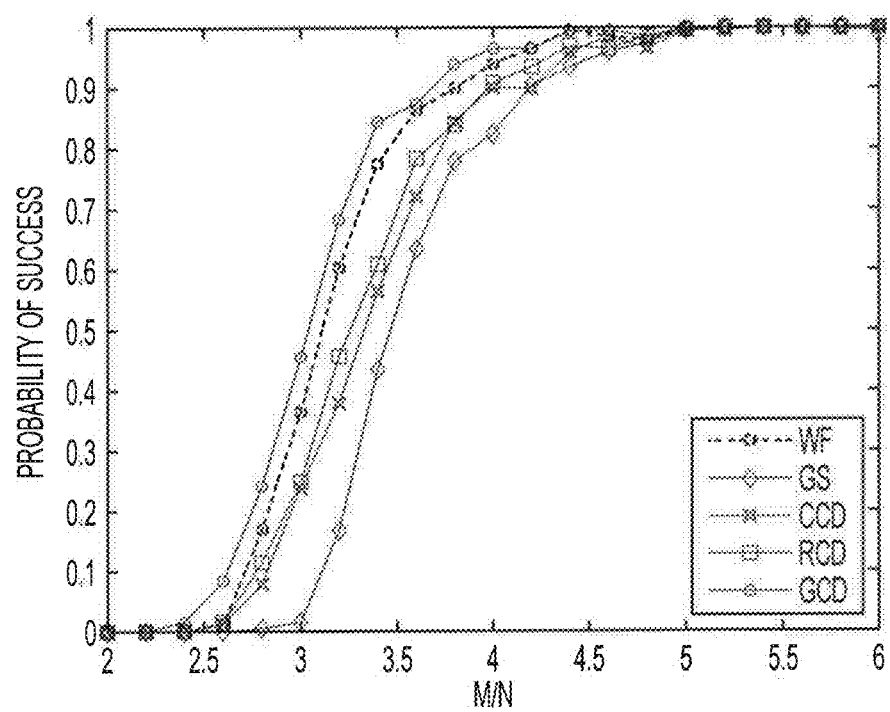
FIG. 3 shows empirical probability of success versus number of noise-free measurements according to one or more embodiments.

FIG. 3 shows the empirical probability of success versus the number of measurements M. It is observed that the GCD is slightly better than WF, while CCD and RCD are slightly inferior to the WF.

Figure 4:
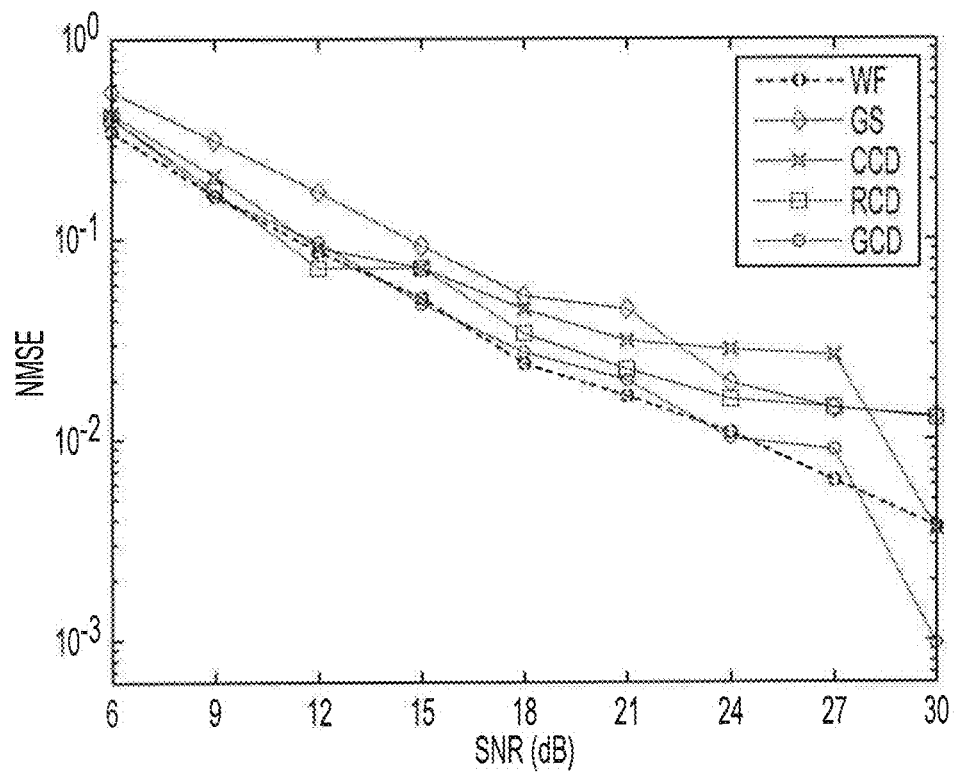
FIG. 4 shows NMSE of recovered signal versus SNR according to one or more embodiments.

FIG. 4 plots the NMSEs versus SNR and it is seen that the three (3) coordinate descent techniques and WF have comparable NMSEs, while each is superior to the GS method.

Phase Retrieval of Sparse Signal

Phase retrieval of a sparse signal with K nonzero elements is also discussed with respect to described embodiments. In addition to WF, the two convex relaxation based methods, namely, PhaseLift and PhaseCut, and sparse GS methods using hard-thresholding are examined for comparison. The regularization factor was set to $\tau=2.35M$ for the $l_1$-CCD and $l_1$-RCD. In this case, the support of the sparse signal is randomly selected from [1, N] where N=64. The real and imaginary parts of the nonzero coefficients of x are drawn as random uniform variables in the range $[-2/\sqrt{2}, -1/\sqrt{2}] \cup [1/\sqrt{2}, 2/\sqrt{2}]$.

Figure 5:
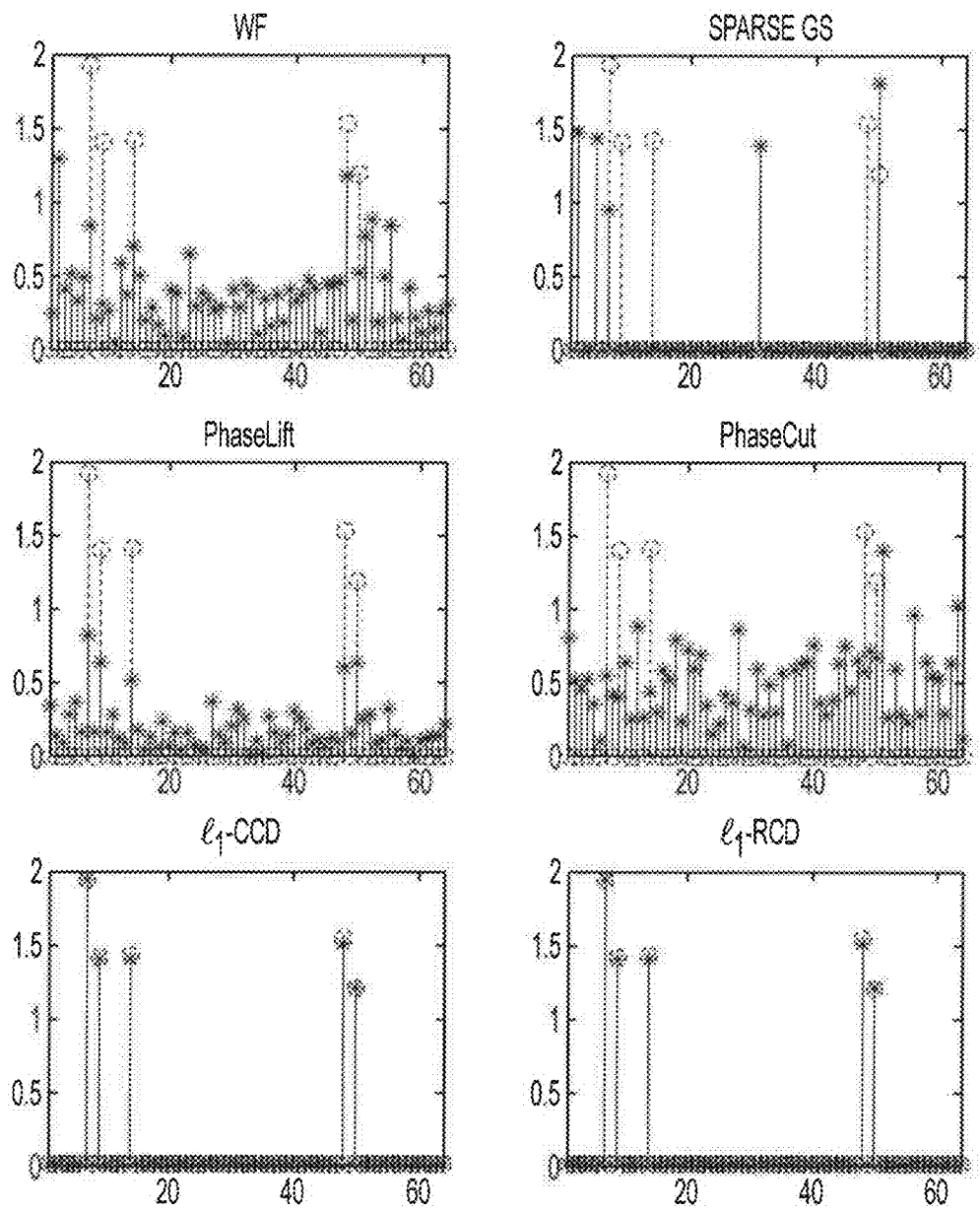
FIG. 5 shows the magnitudes of recovered signals according to one or more embodiments, where lines notated with a star (*) and lines notated with a hollow circle (○) denote the recovered and true signals, respectively.

FIG. 5 shows the recovered signal with K=5 and M=2N in the noise-free case. As seen, the WF, PhaseLift, PhaseCut, and sparse GS methods cannot recover the signal when M is relatively small while the $l_1$-CCD and $l_1$-RCD work well.

Figure 6:
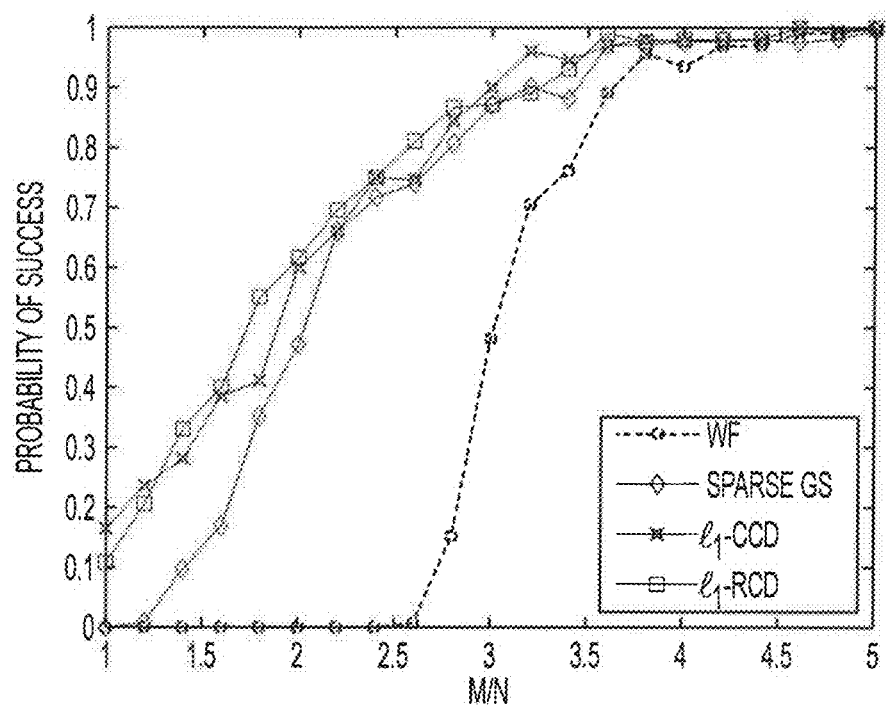
FIG. 6 shows the probability of success versus number of noise-free measurements for sparse phase retrieval according to one or more embodiments.

FIG. 6 plots the probability of success versus number of measurements, which demonstrates the superiority of $l_1$-CCD and $l_1$-RCD.

Blind Equalization

The application of the coordinate descent techniques to blind equalization is discussed with respect to described embodiments and compared to WF method. The results of the conventional super-exponential (SE) algorithm are also included. The transmitted signal adopts quadrature PSK (QPSK) modulation, namely, $s(n) \in \{1, -1, j, -j\}$. A typical finite impulse response (FIR) communication channel with impulse response $\{0.4, 1, -0.7, 0.6, 0.3, -0.4, 0.1\}$ is adopted.

Figure 7:
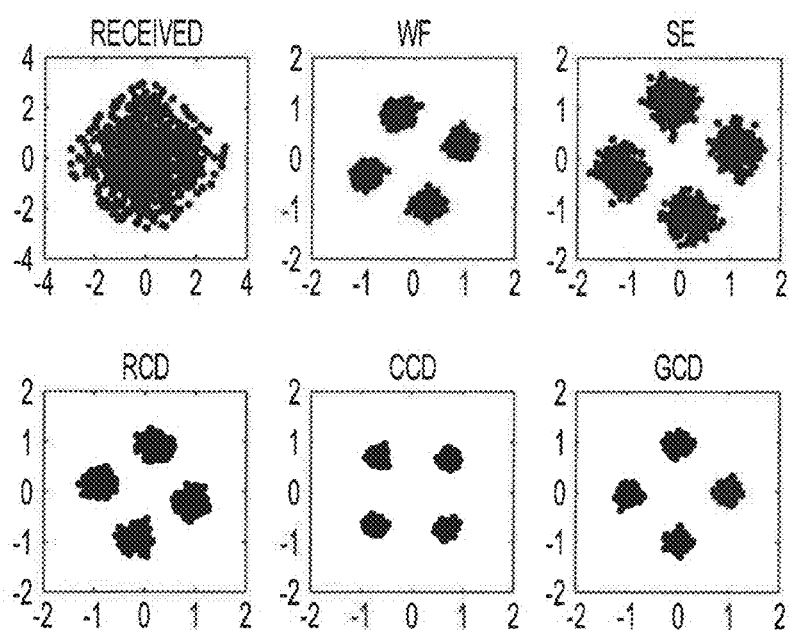
FIG. 7 shows scatter plots of constellations of received signal and equalizer outputs according to one or more embodiments.

FIG. 7 shows the constellations of the received signal and equalizer outputs of 1000 samples with 20 dB zero-mean Gaussian noise. The received signal is severely distorted due to the channel propagation. The SE, WF, and coordinate descent techniques succeed in recovering the transmitted signal up to a global phase rotation. Clearly, the CCD and GCD have a higher recovery accuracy.

Figure 8:
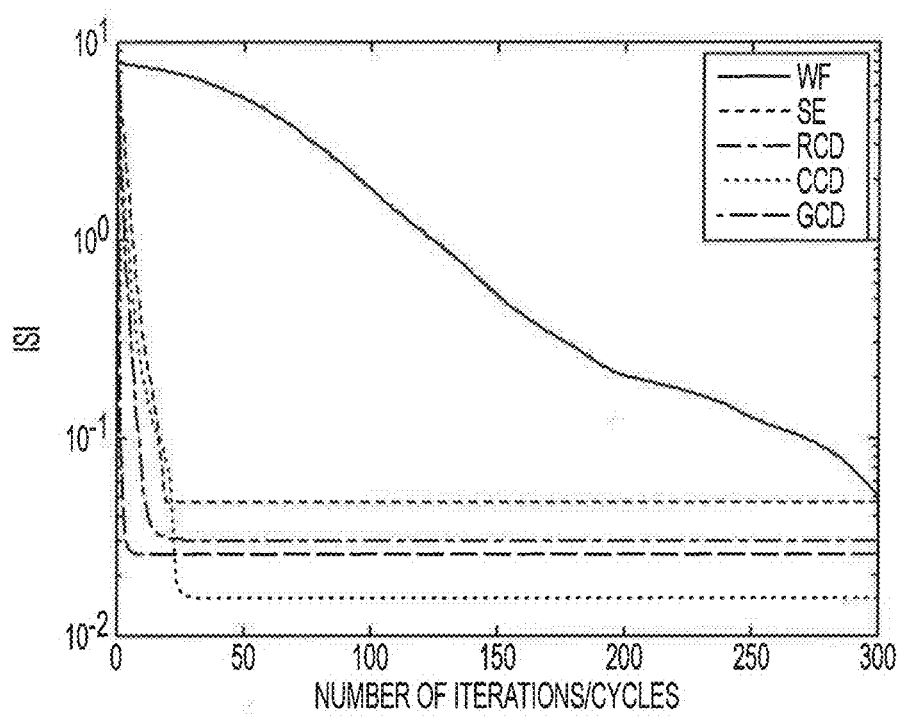
FIG. 8 shows ISI versus number of iterations/cycles according to one or more embodiments.

FIG. 8 plots the ISI versus number of iterations/cycles with 25 dB zero-mean Gaussian noise when there are 2000 samples. The ISI is averaged over 100 independent trials. In addition to faster convergence than the WF and SE methods, the coordinate descent techniques, especially CCD, arrive at a lower ISI. This means that the coordinate descent techniques achieve a more accurate recovery.

With regard to the convergence analysis of the coordinate descent techniques, the inventive concepts described herein prove that the three (3) coordinate descent techniques globally converge to a stationary point from any initial value. Further, the sequence of the iterations generated by the RCD locally converges to the global minimum point in expectation at a geometric rate under a mild assumption. This implies that in the absence of noise, the RCD achieves exact phase retrieval under a moderate condition.

Global Convergence to Stationary Point

Lemma 1: Given any finite initial value $\bar{x}^0 \in \mathbb{R}^{2N}$ and $f(\bar{x}^0)=f_0$, the sublevel set of $f(\bar{x})$ $$S_{f_0} = \{\bar{x}|f(\bar{x}) \leq f_0\} \qquad \text{equation (42)}$$

is compact, i.e., bounded and closed. The iterates of the three coordinate descent techniques, namely, $\bar{x}^k$, k=0, 1, . . . , are in the compact set $S_{f_0}$.

Proof: If $\|\bar{x}\| \to \infty$, then $f(\bar{x}) \to \infty$ on since $f(\bar{x})$ is quartic. The converse-negative proposition implies that $f(\bar{x}) \leq f_0 \leq \infty$ guarantees $\|\bar{x}\|$ for all $\bar{x} \in S_{f_0}$. Hence, $S_{f_0}$ is bounded. Now it is clear that all the points in the sublevel set satisfy $f(\bar{x}) \in [0, f_0]$ since $f(\bar{x}) \geq 0$.

Since the mapping $f(\bar{x})$ is continuous and the image $[0, f_0]$ is a closed set, the inverse image $\{\bar{x}|0 \leq f(\bar{x}) \leq f_0\}$ is also closed. This completes the proof that $S_{f_0}$ is compact. The coordinate descent technique monotonically decreases $f(\bar{x})$, meaning that $f(\bar{x}^k) \leq f(\bar{x}^{k-1}) \leq \ldots \leq f(\bar{x}^0) = f_0$. Therefore, all the iterates $\{\bar{x}^k\}$ must be in the compact set $S_{f_0}$.

Lemma 1 guarantees the analysis can be limited in the compact set $S_{f_0}$ rather than the whole domain of $f(\bar{x})$. The following lemma states that the partial derivatives of $f(\bar{x})$ are locally Lipschitz continuous on $S_{f_0}$, although they are not globally Lipschitz continuous over the whole domain $\mathbb{R}^{2N}$.

Lemma 2: On the compact set $S_{f_0}$, the gradient $\nabla f(\bar{x})$ is component-wise Lipschitz continuous. That is, for each i=1, . . . , 2N, it follows $$|\nabla_i f(\bar{x}+te_i) - \nabla_i f(\bar{x})| \leq L_i |t|, \; t \in \mathbb{R} \qquad \text{equation (43)}$$

for all $\bar{x}, \bar{x}+te_i \in S_{f_0}$, where $L_i > 0$ is called the component-wise Lipschitz constant on $S_{f_0}$. Further, we have $$f(\bar{x} + te_i) \leq f(\bar{x}) + t\nabla_i f(\bar{x}) + \frac{L_i}{2}t^2. \qquad \text{equation (44)}$$

Proof: For t=0, both sides of (43) are equal to 0 and (43) holds. For $t \neq 0$, it means that $\|\bar{x}+te_i - \bar{x}\| = t \neq 0$. Since the function $$\frac{|\nabla_i f(\bar{x} - te_i) - \nabla_i f(\bar{x})|}{\|\bar{x} + te_i - \bar{x}\|} \qquad \text{equation (45)}$$

is continuous on the compact set $S_{f_0}$, its minimum over $S_{f_0}$ is $L_i$, which is attained by Weierstrass' theorem. Then:

$$\max \frac{|\nabla_i f(\bar{x} - te_i) - \nabla_i f(\bar{x})|}{\|\bar{x} + te_i - \bar{x}\|} = L_i \qquad \text{equation (46)}$$

immediately elicits equation (43). The following second-order partial derivative $$\nabla^2_{i,i} f(\bar{x}) = [\nabla^2 f(\bar{x})]_{i,i} = \left[\frac{\partial^2 f(\bar{x})}{\partial \bar{x} \partial \bar{x}^T}\right]_{i,i} = \frac{\partial^2 f(\bar{x})}{\partial x_i^2} \qquad \text{equation (47)}$$

is well defined since $f(\bar{x})$ is twice continuously differentiable. Noting that $\nabla_{i,i}^2 f(\bar{x})$ is the partial derivative of $\nabla_i f(\bar{x})$ with respect to $\bar{x}$, and shown by equation (43), $$\nabla_{i,i}^2 f(\bar{x}) = \lim_{t \to 0} \frac{\nabla_i f(\bar{x} - te_i) - \nabla_i f(\bar{x})}{t} \leq L_i \quad \text{equation (48)}$$

is obtained, which holds for all $\bar{x} \in S_{f_0}$. Applying Taylor's theorem and equation (48), there exists a $\gamma \in [0, 1]$ with $\bar{x} + \gamma t e_i \in S_{f_0}$ such that $$f(\bar{x} - te_i) = f(\bar{x}) + t\nabla f(\bar{x})^T e_i + \frac{t^2}{2} e_i^T \nabla^2 f(\bar{x} - \gamma t e_i) e_i \quad \text{equation (49)}$$

$$= f(\bar{x}) + t\nabla f_i(\bar{x}) + \frac{t^2}{2} \nabla_{i,i}^2 f(\bar{x} - \gamma t e_i) \leq$$

$$f(\bar{x}) + t\nabla f_i(\bar{x}) + \frac{L_i}{2} t^2.$$

The component-wise Lipschitz constant $L_i$ is not easy to compute or estimate because the partial derivatives are complicated multivariate polynomials. However, the coordinate descent techniques do not require $L_i$. This quantity is just used for theoretical convergence analysis. The minimum and maximum of all the component-wise Lipschitz constants are $L_{min} = \min_{1 \leq i \leq 2N} L_i$ and $L_{max} = \max_{1 \leq i \leq 2N} L_i$, respectively. Employing similar steps of Lemma 2, we can prove that the full gradient $\nabla f(\bar{x})$ is Lipschitz continuous:

$$\|\nabla f(\bar{x}) - \nabla f(\bar{z})\| \leq L \|\bar{x} - \bar{z}\| \quad \text{equation (50)}$$

with the "full" Lipschitz constant L. It is not difficult to show $L \leq \Sigma_i L_i$ and thus $L \leq 2N L_{max}$ is obtained.

Theorem 1: The CCD, RCD, and GCD globally converge to a stationary point of the multivariate quartic polynomial from an arbitrary initialization.

Proof: Based on the component-wise Lipschitz continuous property of equation (44), it is derived that:

$$f(\bar{x}^{k+1}) = \min f(\bar{x}^k + \alpha e_{i_k}) \leq \quad \text{equation (51)}$$

$$f(\bar{x}^k + \alpha e_{i_k})|_{\alpha = -\nabla_{i_k} f(\bar{x}^k)/L_{i_k}}$$

$$= f\left(\bar{x}^k - \frac{\nabla_{i_k} f(\bar{x}^k)}{L_{i_k}} e_{i_k}\right) \leq$$

$$f(\bar{x}^k) - \frac{(\nabla f_{i_k}(\bar{x}^k))^2}{L_{i_k}} + \frac{L_{i_k}}{2} \frac{(\nabla f_{i_k}(\bar{x}^k))^2}{L_{i_k}^2}$$

$$= f(\bar{x}^k) - \frac{1}{2L_{i_k}} (\nabla f_{i_k}(\bar{x}^k))^2 \leq$$

$$f(\bar{x}^k) - \frac{1}{2L_{max}} (\nabla f_{i_k}(\bar{x}^k))^2$$

from which we obtain a lower bound on the progress made by each coordinate descent technique iteration $$f(\bar{x}^k) - f(\bar{x}^{k+1}) \geq \frac{1}{2L_{max}} (\nabla f_{i_k}(\bar{x}^k))^2. \quad \text{equation (52)}$$

For different rules of index selection, the right-hand side of equation (52) will differ. For GCD, it chooses the index with the largest partial derivative magnitude. Hence, by equation (9), it follows $$(\nabla f_{i_k}(\bar{x}^k))^2 = \|(\nabla f(\bar{x}^k)\|_\infty^2 \geq \frac{1}{2N} \|\nabla f(\bar{x}^k)\|^2. \quad \text{equation (53)}$$

Plugging equation (53) into equation (52) leads to the following lower bound of the progress of one GCD iteration $$f(\bar{x}^k) - f(\bar{x}^{k+1}) \geq \frac{1}{4NL_{max}} \|\nabla f_{i_k}(\bar{x}^k)\|^2. \quad \text{equation (54)}$$

This means that one GCD iteration decreases the objective function with an amount of at least $\|\nabla f(\bar{x}^k)\|^2/(4N L_{max})$. Setting is k=0, ..., j, in equation (54) and summing over all inequalities yields $$\sum_{k=0}^{j} \|\nabla f(\bar{x}^k)\|^2 \leq 4NL_{max}(f(\bar{x}^0) - f(\bar{x}^{j+1})) \leq 4NL_{max}f_0 \quad \text{equation (55)}$$

where $f(\bar{x}^{j+1}) \geq 0$ is used. Taking the limit as $j \to \infty$ on equation (55), a convergent series is obtained $$\sum_{k=0}^{\infty} \|\nabla f(\bar{x}^k)\|^2 \leq 4NL_{max}f_0. \quad \text{equation (56)}$$

If a series converges, then its terms approach to zero, which indicates $\nabla f(\bar{x}^k)$ is a zero vector as $k \to \infty$, that is, the GCD converges to a stationary point.

For RCD, since $i_k$ is a random variable, $f(\bar{x}^{k+1})$ is also random:

$$E[f(\bar{x}^{k+1})] \leq E\left[f(\bar{x}^k) - \frac{1}{2L_{max}} (\nabla f_{i_k}(\bar{x}^k))^2\right] = \quad \text{equation (57)}$$

$$f(\bar{x}^k) - \frac{1}{2L_{max}} \sum_{i=1}^{2N} \frac{1}{2N} (\nabla f_i(\bar{x}^k))^2 =$$

$$f(\bar{x}^k) - \frac{1}{4NL_{max}} \|\nabla f(\bar{x}^k)\|^2$$

where the fact that $i_k$ is uniformly sampled from $\{1, \ldots, 2N\}$ with equal probability of $1/(2N)$ is employed. Then the RCD at least obtains a decrease on the objective function in expectation $$f(\bar{x}^k) - E[f(\bar{x}^{k+1})] \geq \frac{1}{4NL_{max}} \|\nabla f(\bar{x}^k)\|^2. \quad \text{equation (58)}$$

Following similar steps in the GCD, it is sufficient to prove that the expected gradient of the RCD approaches to the zero (0) vector and thus converges to a stationary point in expectation.

For CCD, $i_k$ takes value cyclically from $\{1, \ldots, 2N\}$. Applying the property of CCD, a lower bound of the decrease of the objective function after 2N CCD iterations can be derived:

$$f(\bar{x}^k) - f(\bar{x}^{k+2N}) \geq \frac{\|\nabla f(\bar{x}^k)\|^2}{4L_{max}(1 + 2NL^2/L_{min}^2)}. \quad \text{equation (59)}$$

Setting k=0, 2N, ..., 2jN, in equation (59) and summing over all the inequalities yields $$\sum_{k=0}^{j} \|\nabla f(\bar{x}^{2kN})\|^2 \leq \frac{(f(\bar{x}^0) - f(\bar{x}^{2(j+1)N}))}{4L_{max}(1 + 2NL^2/L_{min}^2)} \quad \text{equation (60)}$$

$$\leq \frac{f(\bar{x}^0)}{4L_{max}(1 + 2NL^2/L_{min}^2)}.$$

Taking the limit as $j \to \infty$ of (60) yields a convergent series. Thus, the gradient approaches to zero, indicating that the CCD converges to a stationary point.

Local Convergence to Global Minimum

If x* is an optimal solution of equation (2), then all the elements of the following set $$\mathcal{P}_c := \{e^{j\phi} x^*, \phi \in [0, 2\pi)\} \quad \text{equation (61)}$$

are also optimal solutions of equation (2). The distance of a vector $z \in \mathbb{C}^N$ to $\mathcal{P}_c$ is $$dist(z, \mathcal{P}_c) = \min_{\phi} \|z - e^{j\phi} x^*\| \quad \text{equation (62)}$$

and the minimum of equation (62) attains at $\phi = \phi(z)$. Similarly, the set of all optimal solutions of the real-valued problem (3) is defined as $$\mathcal{P} := \left\{ \begin{bmatrix} \text{Re}(e^{j\phi} x^*) \\ \text{Im}(e^{j\phi} x^*) \end{bmatrix} \triangleq T_\phi(\bar{x}^*), \phi \in [0, 2\pi) \right\} \quad \text{equation (63)}$$

where $\bar{x}^* = [\text{Re}(x^*)^T \ \text{Im}(x^*)^T]^T$ is a global minimizer of (3). That is, $T_\phi(\bar{x}^*)$ denotes the effect of a phase rotation to $\bar{x}^*$. The projection of onto $\mathcal{P}$ is the point in $\mathcal{P}$ closest to $\bar{x}^k$, which is denoted as $T_{\phi_k}(\bar{x}^*)$ where $$\phi_k = \arg\min_{\phi} \|\bar{x}^k - T_\phi(\bar{x}^*)\|. \quad \text{equation (64)}$$

Then the distance of $\bar{x}^k$ to $\mathcal{P}$ is $$dist(\bar{x}^k, \mathcal{P}) = \min_{\phi} \|\bar{x}^k - T_\phi(\bar{x}^*)\| \quad \text{equation (65)}$$

$$= \|\bar{x}^k - T_{\phi_k}(\bar{x}^*)\|.$$

Proving that $dist(\bar{x}^k, \mathcal{P}) \to 0$ further explains the benefits of embodiments described herein. The following lemma, which essentially states that the gradient of the objective function is well behaved, is crucial to the proof.

Lemma 3: For any $z \in \mathbb{C}^N$ with $dist(z, \mathcal{P}_c) \leq \epsilon$, the regularity condition $$\text{Re}(\langle \nabla f(z), z - e^{j\phi(z)} x^* \rangle) \geq \rho \, dist(z, \mathcal{P}_c) + \eta \|\nabla f(z)\|^2, \rho > 0, \eta > 0 \quad \text{equation (66)}$$

holds with high probability if the number of measurements satisfies $M \geq C_0 N \log N$ with $C_0 > 0$ being a sufficiently large constant.

Although the regularity condition of Lemma 3 corresponds to the complex-valued case, the real-valued version according to equation (63) and equation (64) is obtained at once. For $\bar{x}^k$ satisfying $dist(\bar{x}^k, \mathcal{P}) \leq \epsilon$, we have:

$$\langle \nabla f(\bar{x}^k), \bar{x}^* \rangle \geq \rho \, dist(\bar{x}^k, \mathcal{P}) + \eta \|\nabla f(\bar{x}^k)\|^2. \quad \text{equation (67)}$$

Theorem 2: Assume that the sample size satisfies $M \geq C_0 N \log N$ with a sufficiently large $C_0$. The RCD with a slight modification, in which the one-dimensional search is limited to a line segment, that is:

$$\alpha_k = \arg\min_{\alpha} f(\bar{x}^k + \alpha e_{i_k}), \text{ s.t. } |\alpha| \leq 2\eta |\nabla f_{i_k}(\bar{x}^k)| \quad \text{equation (68)}$$

converges to $\mathcal{P}$ in expectation with high probability at a geometric rate $$\mathbb{E}[dist^2(\bar{x}^{k+1}, \mathcal{P})] \leq \left(1 - \frac{\rho \gamma_{max}}{N}\right)^k dist^2(\bar{x}^0, \mathcal{P}), \quad \text{equation (69)}$$

$$\gamma_{max} > 0.$$

Proof: The updating equation of the CD, i.e., $\bar{x}^{k+1} = \bar{x}^k + \alpha_k e_{i_k}$, is equivalently expressed as $$\bar{x}^{k+1} = \bar{x}^k - \gamma_k \nabla f_{i_k}(\bar{x}^k) e_{i_k} \quad \text{equation (70)}$$

where $\gamma_k = -\alpha_k / \nabla f_{i_k}(\bar{x}^k)$. It requires $\gamma > 0$ to ensure $f(\bar{x}^{k+1}) < f(\bar{x}^k)$. Hence, $|\alpha_k| \leq 2\eta |\nabla f_i(\bar{x}^k)|$ means $0 < \gamma_k \leq 2\eta$. Beginning from equation (65), it follows $$dist^2(\bar{x}^{k+1}, \mathcal{P}) = \|\bar{x}^{k+1} - T_{\phi_{k+1}}(\bar{x}^*)\|^2 \quad \text{equation (71)}$$

$$\leq \|\bar{x}^{k+1} - T_{\phi_k}(\bar{x}^*)\|^2$$

$$= \|\bar{x}^k - \gamma_k \nabla f_i(\bar{x}^k) e_{i_k} - T_{\phi_k}(\bar{x}^*)\|^2$$

$$= \|\bar{x}^k - T_{\phi_k}(\bar{x}^*)\|^2 + \gamma_k^2 (\nabla f_{i_k}(\bar{x}^k))^2 -$$

$$2\gamma_k \nabla f_{i_k}(\bar{x}^k) e_{i_k}^T (\bar{x}^k - T_{\phi_k}(\bar{x}^*))$$

$$= dist^2(\bar{x}^k, \mathcal{P}) + \gamma_k^2 (\nabla f_{i_k}(\bar{x}^k))^2 -$$

$$2\gamma_k \nabla f_{i_k}(\bar{x}^k) [\bar{x}^k - T_{\phi_k}(\bar{x}^*)]_{i_k}.$$

It is already known that $\mathbb{E}[(\nabla f_{i_k}(\bar{x}^k))^2] = \|\nabla f(\bar{x}^k)\|^2 / (2N)$ by (57). This also yields $$\mathbb{E}\left[\nabla f_{i_k}(\bar{x}^k)[\bar{x}^k - T_{\phi_k}(\bar{x}^*)]_{i_k}\right] = \quad \text{equation (72)}$$

$$\frac{1}{2N} \sum_{i=1}^{2N} \nabla f_{i_k}(\bar{x}^k)[\bar{x}^k - T_{\phi_k}(\bar{x}^*)]_i =$$

$$\frac{1}{2N} \langle \nabla f(\bar{x}^k), \bar{x}^k - T_{\phi_k}(\bar{x}^*) \rangle \geq$$

$$\frac{\rho}{2N} dist(\bar{x}^k, \mathcal{P}) + \frac{\eta}{2N} \|\nabla f(\bar{x}^k)\|^2$$

where the last line follows from equation (67). Combining equation (71) and equation (72) yields $$\mathbb{E}[dist^2(\bar{x}^{k+1}, \mathcal{P})] \leq \qquad \text{equation (73)}$$

$$\left(1 - \frac{\rho\gamma_k}{N}\right)dist^2(\bar{x}^k, \mathcal{P}) + \frac{\gamma_k}{2N}(\gamma_k - 2\eta)\|\nabla f(\bar{x}^k)\|^2 \leq$$

$$\left(1 - \frac{\rho\gamma_k}{N}\right)dist^2(\bar{x}^k, \mathcal{P})$$

where the last inequality follows from $0<\gamma_k \leq 2\eta$. Successively applying equation (58), the following is obtained:

$$\mathbb{E}[dist^2(\bar{x}^{k+1}, \mathcal{P})] \leq \prod_{j=1}^{k}\left(1 - \frac{\rho\gamma_j}{N}\right)dist^2(\bar{x}^0, \mathcal{P}) \leq \qquad \text{equation (74)}$$

$$\left(1 - \frac{\rho\gamma_{min}}{N}\right)^k dist^2(\bar{x}^0, \mathcal{P}),$$

$$\gamma_{min} = \min_{1 \leq j \leq k} \gamma_j.$$

As seen from the foregoing, embodiments of the phase retrieval system enable recovery of a signal using intensity measurements and, in doing so, recover the phase of the signal given only the magnitude-square component. This is done in a fast manner even when the sample number is small. Certain embodiments can also be applied for the recovery of sparse signals. These features are enabled by a novel framework for employing coordinate descent techniques. These techniques include three variants, namely, CCD, RCD, and GCD, which are devised for phase retrieval of general signals-of-interest. At each iteration, the coordinate descent technique only needs to find the minimum of a univariate quartic polynomial, which is achieved by finding the closed-form roots of a cubic polynomial. Thus, the coordinate descent technique is computationally simple and easy to implement.

Although the phase retrieval problem can be expressed as minimization of a multivariate quartic polynomial, it is still NP-hard. However, by applying coordinate descent, only the minimum of a univariate quartic polynomial at each iteration is determined. This yields a closed-form solution. The described coordinate descent techniques for phase retrieval, namely, CCD, RCD and GCD, are computationally simple and converge faster than WF, which is the state-of-the-art approach.

To further explain these features, it is theoretically proven that the three (3) coordinate descent techniques converge to a stationary point from any initial value. It is further proved that, according to certain embodiments, the RCD converges to the global minimum and achieves exact retrieval with high probability provided that the sample size is sufficiently large. Also, with the use of $l_1$-regularization, CCD and RCD are extended for phase retrieval of sparse signals, referred to a $l_1$-CCD and $l_1$-RCD, respectively. The $l_1$-CCD and $l_1$-RCD outperform previously known techniques, namely, WF, PhaseLift, and PhaseCut, particularly when the number of intensity measurements is small.

According to other embodiments, CCD, RCD and GCD can be applied to blind equalization of constant-modulus communication signals. These techniques are superior to the benchmarks of WF and SE methods in terms of faster convergence and smaller ISI.

Figure 9:
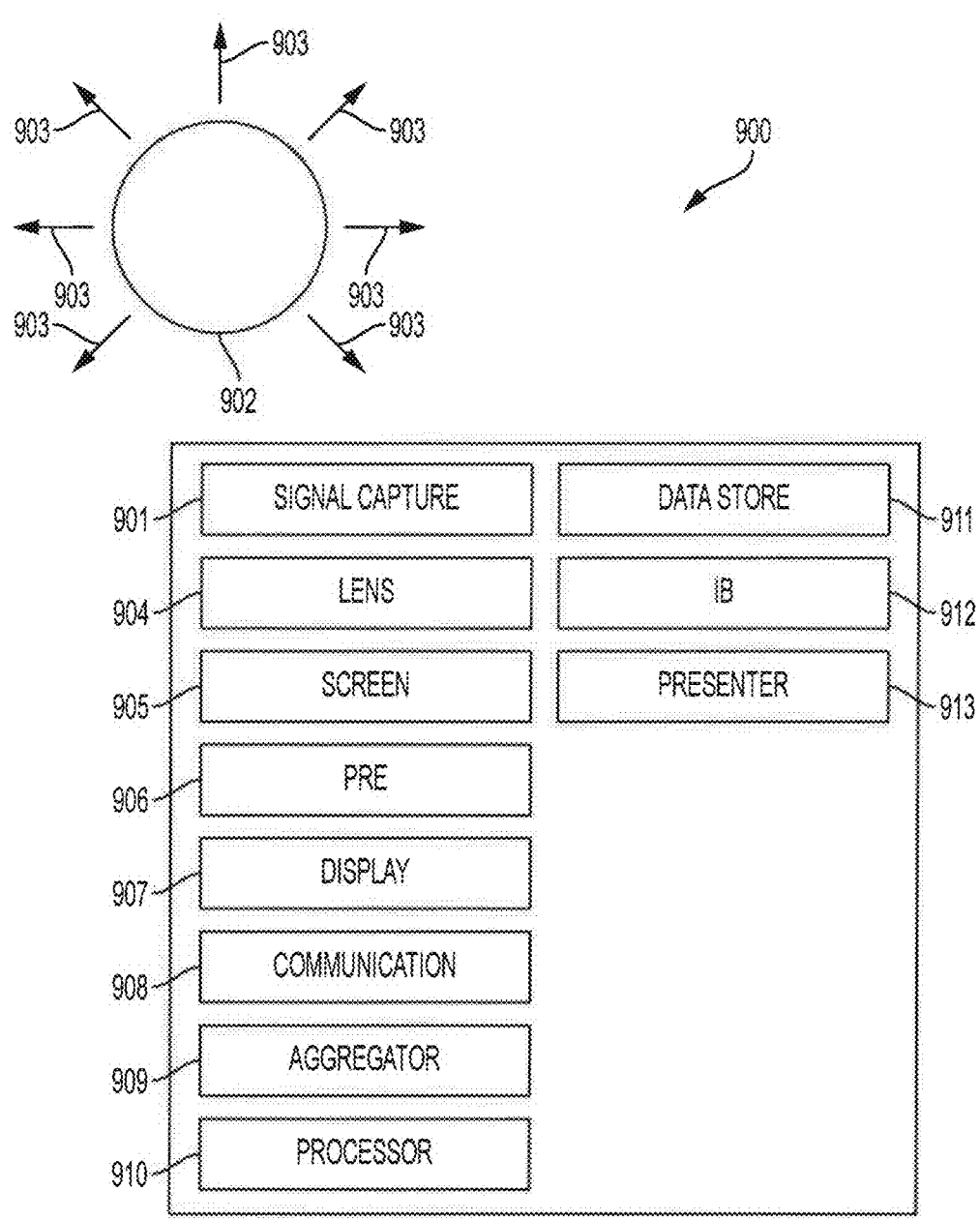
FIG. 9 shows a phase retrieval system according to one or more embodiments.

FIG. 9 shows a block diagram of phase retrieval system 900 for recovering a full signal-of-interest. Phase retrieval system 900 can be used with, or be part of, a system(s) that include, e.g., a telescope, a microscope, or other optical system using phase retrieval techniques and utilized in various applications, including astronomy, computational biology, crystallography, digital communications, electron microscopy, neutron radiography and optical imaging.

System 900 comprises signal capture block 901, which captures signals, e.g., transmitted or reflected by object 902. Signal capture block 901 receives or otherwise obtains signals or signal data relating to object 902, which can be signals-of-interest which are recovered by system 900.

Object 902, which may be a celestial star, a transmission antenna, or other signal source, emits or reflects signals to form incoming wave front 903. Wave front 903 may be a spherical wave front, a plane wave front, or the like. Wave front 903 propagates from object 902 to phase retrieval system 900. System 900 iterates a series of operations and has an input and an output. A data set having a plurality of elements, each element containing magnitude and phase information, is received at the input. After completing an iteration, the method outputs a new approximation of the received data set, and this approximation forms the basis for the input to the next iteration. It is intended that each iteration is a better approximation than the last iteration.

Within system 900, wave front 903 is applied to optics including lens 904, which can be a Fourier transform lens having its focus at screen 905. For instance, according to embodiments in which lens 904 is a Fourier transform lens, lens 904 performs a frequency-space transformation to produce a reconstruction of wave front 903 at the screen 905 in the spatial domain.

In operation of system 900, phase retrieval engine (PRE) 906 receives a full signal-of-interest from intensity or magnitude information utilizing the iterative coordinate descent techniques described herein. PRE 906 is in commutation with processors of system 900 and other components to enable the functions described herein.

Display unit 907 displays one or more signals-of-interest based on the coordinate descent techniques utilized by system 900 in a given embodiment. Display unit 907 can be electronically accessible and communicatively connected to other components of phase retrieval system 900. According to some embodiments, each pixel of a display device comprising display unit 907 is electronically accessible to other components of phase retrieval system 900. Receiving data from components of phase retrieval system 900, display unit 907 can display the signals-of-interest at or near real time.

Display unit 907 and components of phase retrieval system 900 operate in conjunction with one another to present the signals of interest to a user. Display unit 907 can be, or can comprise, a display device(s), such as an SLM display device or an LCoS display device. In other embodiments, display unit 907 can comprise one or more of high-resolution LCDs, 3D television (TV) displays, high-resolution LCoS display devices, high-resolution SLM display devices, or other desired display devices suitable for displaying the signals-of-interest.

It should be appreciated that signal-of-interest can be communicated over wired or wireless communication channels to display unit 907 or other display components (e.g., remote display components, such as a 3D TV display) to facilitate generation and display of the 3D signals-of-interest.

Phase retrieval system 900 can comprise additional components that enable system 900 to execute functions described herein. For example, phase retrieval system 900 further comprises communication block 908 that communicates information between components of phase retrieval system 900 (e.g., display component(s), capture device(s), processor component(s), user interface(s), data store(s), etc.). The information includes, for example, a source object, signal-of-interests, information relating to defined signal-of-interest generation criterion(s), information relating to an algorithm(s) that facilitate generating signals-of-interest, etc.

Phase retrieval system 900 also comprises aggregator 909 that aggregates data received from various entities (e.g., capture device(s), display component(s), processor component(s), user interface(s), data store(s), etc.). Aggregator 909 correlates respective items of data based at least in part on type of data, source of the data, time or date the data was generated or received, point with which data is associated, image with which data is associated, pixel with which a transparency level is associated, etc., to facilitate processing of the data.

Phase retrieval system 900 also can comprise a processor 910 that can operate in conjunction with the other components to perform the various functions of phase retrieval system 900. Processor 910 can employ one or more processors (e.g., central processing units (CPUs), GPUs, FPGAs, etc.), microprocessors, or controllers that can process data, such as data relating to parameters associated with phase retrieval system 900 and associated components, etc., to perform operations relating to generating signal-of-interests.

Phase retrieval system 900 can also comprise data store 911 that stores data structures (e.g., user data, metadata); code structure(s) (e.g., modules, classes, procedures), commands, or instructions; information relating to generating a signal-of-interest, parameter data; algorithms; criterion(s) relating to signal-of-interest generation; and so on.

Processor 910 can be functionally coupled to data store 911 to store and retrieve information desired to operate and/or confer functionality, at least in part, to other system components and/or substantially any other operational aspects of phase retrieval system 900. It should be appreciated that the various components of phase retrieval system 900 can communicate information between each other and/or between other components associated with phase retrieval system 900 as desired to carry out operations of phase retrieval system 900. It should be further appreciated that respective components of phase retrieval system 900 each can be a stand-alone unit, can be included within phase retrieval system 900 (as depicted), can be incorporated within another component of phase retrieval system 900 or a component separate from phase retrieval system 900, and/or a combination thereof.

Phase retrieval system 900 can further comprise intelligence block 912 that can be associated with (e.g., communicatively connected to) processor 910 and/or other components associated with system 900 to facilitate analyzing data, such as current and/or historical information, and, based at least in part on such information, can make an inference(s) and/or a determination(s) and the like. For example, based in part on current and/or historical evidence, intelligence block 912 can infer or determine a process or algorithm to use.

Intelligence block 912 communicates information related to the inferences and/or determinations to processor 910. Based on the inference(s) or determination(s) made by intelligence block 912, processor 910 can take one or more actions to facilitate generating a signal-of-interest.

Intelligence block 912 reasons about or infers states of system 900, its environment, and/or users from a set of observations as captured via events and/or data. Inferences can be employed to identify a specific context or action, or can generate a probability distribution over states, for example. The inference can be probabilistic—that is, the computation of a probability distribution over states of interest based on a consideration of data and events. Inferences can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

System 900 also can comprise presenter 913, which is connected to processor 910. Presenter 913 provides various types of user interfaces to facilitate interaction between a user and any component coupled to processor 910. Presenter 913 can be a separate entity that can be utilized with processor 910 and associated components. However, it is to be appreciated that presenter 913 and/or similar view components can be incorporated into processor 910 and/or can be a stand-alone unit. Presenter 913 provides one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. The user can interact with one or more of the components coupled to and/or incorporated into the processor 910.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API, in addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the processor 910 and/or other components, can be situated or implemented on a single integrated-circuit chip. In accordance with another embodiment, processor 910, and/or other components, can be implemented on an application-specific integrated-circuit (ASIC) chip. In yet another embodiment, processor 910 and/or other components, can be situated or implemented on multiple dies or chips.

Figure 10:
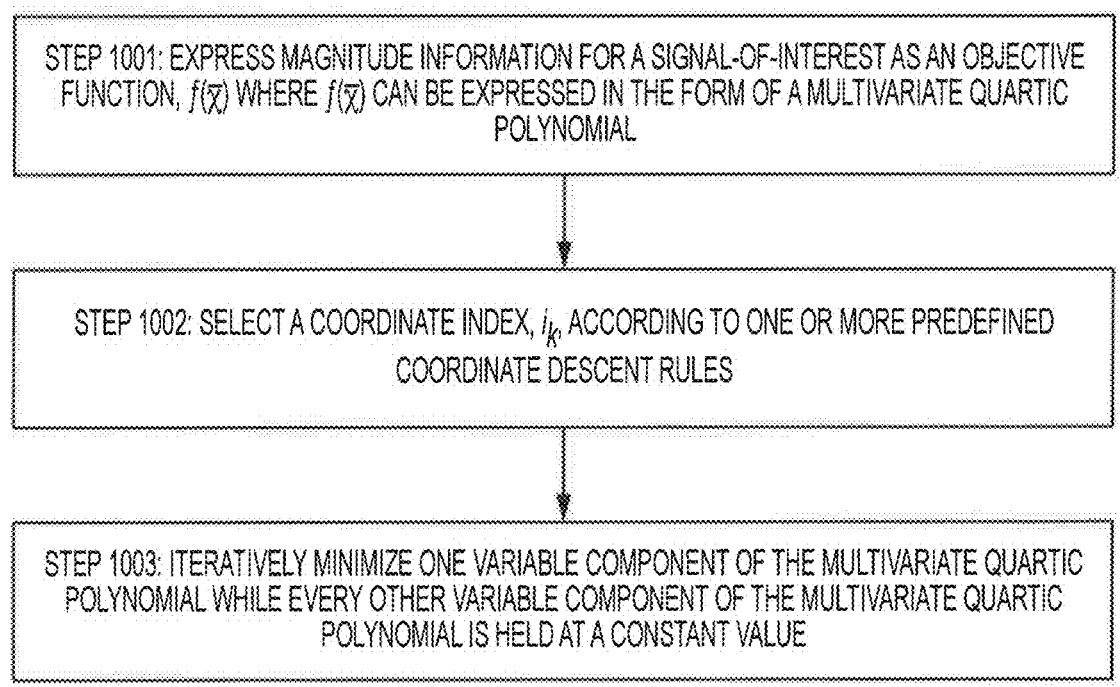
FIG. 10 shows a phase retrieval method according to one or more embodiments.

FIG. 10 shows a flow diagram of an exemplary method performed according to the concepts described herein. Method 1000 is performed to efficiently retrieve phase information for a signal-of-interest and can be executed by a phase retrieval system, such as system 900 shown at FIG. 9.

At step 1001, magnitude information for a signal-of-interest is expressed as an objective function, $f(\bar{x})$. As previously discussed, the objective function, $f(\bar{x})$, can be expressed in the form of a multivariate quartic polynomial.

At step 1002, a coordinate index, $i_k$, is selected according to one or more predefined coordinate descent rules. The coordinate descent rules can be one or more of a cyclic rule, a random rule, or a greedy rule. In one embodiment, the coordinate index, $i_k$, is cyclically assigned sequential values from 1 to 2N for each of the variable components of the multivariate quartic polynomial. In another embodiment, the coordinate index, $i_k$, is randomly assigned values from 1 to 2N, where each value is assigned with equal probability, for each of the variable components of the multivariate quartic polynomial. In yet another embodiment, the coordinate index, $i_k$, is assigned a value of:

$$i_k = \arg\min_i |\nabla f_i(\bar{x}^k)|, \quad \text{equation (75)}$$

$$\nabla f_i(\bar{x}^k) = \frac{\partial f(\bar{x}^k)}{\partial \bar{x}_i^k}.$$

At step 1003, one variable component of the multivariate quartic polynomial is minimized while every other variable component of the multivariate quartic polynomial is held at a constant value. Preferably, this is done on an iterative basis where, at each iteration, a different component is minimized while the other components are held at constant values. According to one embodiment, for the kth iteration, this is done by minimizing $f(\bar{x}^k)$ with respect to the $i_k$th ($i_k \in \{1, \ldots, 2N\}$) variable while maintaining the remaining 2N−1 $\{\bar{x}_i^k\}_{i \neq i_k}$ variables at a constant value. Also, step 1003 can involve solving only one variable component while maintain every other variable component at a constant value.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for obtaining phase information for a signal-of-interest from only magnitude information for the signal-of-interest, the method comprising:
   capturing, using a capture device, magnitude information for the signal-of-interest;
   determining an objective function, $f(\bar{x})$, as a function of the magnitude information, the objective function being in the form of a multivariate quartic polynomial;
   selecting a coordinate index, $i_k$, according to one or more predefined coordinate descent rules;
   iteratively minimizing, according to the selected coordinate index, the multivariate quartic polynomial, where minimizing the multivariate quartic polynomial comprises:
   minimizing only one variable component of the multivariate quartic polynomial while maintaining every other variable component of the multivariate quartic polynomial at a constant value; and
   displaying, to a user, via a presenter communicatively coupled to the capture device that facilitates interaction between the user and at least the capture device, a graphical user interface, where the graphical user interface comprises:
   a first graphic region displaying phase information of the signal-of-interest to the user, a second graphic region displaying magnitude information for the signal-of-interest to the user, and a third region to receive user input comprising capture device, input comprising capture device operating instructions.

2. The method of claim 1 where selecting the coordinate index, $i_k$, comprises:
   cyclically assigning $i_k$ sequential values for each of the variable components of the multivariate quartic polynomial.

3. The method of claim 1 where selecting the coordinate index, $i_k$, comprises:
   randomly assigning $i_k$ values, where each value is assigned with equal probability, for each of the variable components of the multivariate quartic polynomial.

4. The method of claim 1 where selecting the coordinate index, $i_k$, comprises:
   assigning $i_k$ as:

$$i_k = \arg\min_i |\nabla f_i(\bar{x}^k)|,$$

$$\nabla f_i(\bar{x}^k) = \frac{\partial f(\bar{x}^k)}{\partial \bar{x}_i^k}.$$

5. The method of claim 1 where iteratively minimizing only one variable component of the multivariate quartic polynomial while maintaining every other variable component of the multivariate quartic polynomial at a constant value comprises:

for the kth iteration, minimizing $f(\overline{x}^k)$ with respect to the $i_k$th ($i_k \in \{1, \ldots, 2N\}$) variable while maintain remaining $2N-1\{\overline{x}_i^k\}_{i \neq k}$ variable components at a constant value.

6. The method of claim 1 where iteratively minimizing only one variable component of the multivariate quartic polynomial while maintaining every other variable component of the multivariate quartic polynomial at a constant value comprises:
solving the only one variable component while maintain every other variable component at a constant value.

7. The method of claim 1 where the one or more predefined coordinate descent rules is selected from the group consisting of:
a cyclic rule;
a random rule; and
a greedy rule.

8. The method of claim 1 where the signal-of-interest is a sparse signal and one or more of the predefined coordinate descent rules is obtained by minimizing a $l_1$-regularized quartic polynomial.

9. A system for obtaining phase information for a signal-of-interest from only magnitude information for the signal-of-interest, the system comprising:
a capture device that captures at least magnitude information for the signal-of-interest;
a memory;
one or more processors coupled to the memory, the one or more processors:
determining an objective function, $f(\overline{x})$, as a function of the magnitude information, the objective function being in the form of a multivariate quartic polynomial;
selecting a coordinate index, $i_k$, according to one or more predefined coordinate descent rules; and
iteratively minimizing, according to the selected coordinate index, the multivariate quartic polynomial, where minimizing the multivariate quartic polynomial comprises:
minimizing only one variable component of the multivariate quartic polynomial while maintaining every other variable component of the multivariate quartic polynomial at a constant value; and
a presenter communicatively coupled to the capture device that facilitates interaction between the user and at least the capture device, a graphical user interface, where the graphical user interface comprises:
a first graphic region displaying phase information of the signal-of-interest to the user, a second graphic region displaying magnitude information for the signal-of-interest to the user, and a third region to receive user input comprising capture device input comprising capture device operating instructions.

10. The system of claim 9 where selecting the coordinate index, $i_k$, comprises:
cyclically assigning $i_k$ sequential values for each of the variable components of the multivariate quartic polynomial.

11. The system of claim 9 where selecting the coordinate index, $i_k$, comprises:
randomly assigning $i_k$ values, where each value is assigned with equal probability, for each of the variable components of the multivariate quartic polynomial.

12. The system of claim 9 where selecting the coordinate index, $i_k$, comprises:
assigning $i_k$ as:

$$i_k = \underset{i}{\mathrm{argmin}} |\nabla f_i(\overline{x}^k)|,$$

$$\nabla f_i(\overline{x}^k) = \frac{\partial f(\overline{x}^k)}{\partial \overline{x}_i^k}.$$

13. The system of claim 9 where iteratively minimizing only one variable component of the multivariate quartic polynomial while maintaining every other variable component of the multivariate quartic polynomial at a constant value comprises:
for the kth iteration, minimizing $f(\overline{x}^k)$ with respect to the $i_k$th ($i_k \in \{1, \ldots, 2N\}$) variable while maintain remaining $2N-1\{x_i^k\}_{i \neq i_k}$ variables at a constant value.

14. The system of claim 9 where iteratively minimizing only one variable component of the multivariate quartic polynomial while maintaining every other variable component of the multivariate quartic polynomial at a constant value comprises:
solving the only one variable component while maintain every other variable component at a constant value.

15. The system of claim 9 where the one or more predefined coordinate descent rules is selected from the group consisting of:
a cyclic rule;
a random rule; and
a greedy rule.

16. The system of claim 9 where the signal-of-interest is a sparse signal and one or more of the predefined coordinate descent rules are obtained by minimizing a $l_1$-regularized quartic polynomial.

* * * * *

UNITED STATES PATENT AND TRADEMARK OFFICE
CERTIFICATE OF CORRECTION

| | |
|---|---|
| PATENT NO. | : 10,437,560 B2 |
| APPLICATION NO. | : 15/344279 |
| DATED | : October 8, 2019 |
| INVENTOR(S) | : Wen-Jun Zeng et al. |

It is certified that error appears in the above-identified patent and that said Letters Patent is hereby corrected as shown below:

In the Specification

At Column 1, Line number 40, delete "Gerchherg-Saxon" and replace with --Gerchberg-Saxon--.

At Column 3, Line number 20, delete "nondeterministic" and replace with --non-deterministic--.

At Column 4, Line number 25, equation 5, delete the portion of the equation reading "Re(x) -Im($A_m$)" and replace with --Re($A_m$) -Im($A_m$)--.

At Column 4, Line number 26, equation 5, delete the portion of the equation reading "Im(x) Re($A_m$)" and replace with --Im($A_m$) Re($A_m$)--.

At Column 5, Line number 64, equation 12, delete the portion of the equation reading "$\alpha e_1$" and replace with --$\alpha e_i$--.

At Column 9, Line number 4, equation 31, delete the portion of the equation reading "$4u_4\beta^3 + 3u_3\beta^2 2 + u_2\beta$" and replace with --$4u_4\beta^3 + 3u_3\beta^2 + 2u_2\beta$--.

At Column 10, Line number 10, delete "v=(n)=h(n)*w(n)" and replace with --v(n)=h(n)* w(n)--.

At Column 10, Line number 52, delete "where $T_{\phi_k}(\bar{x}^*)$ is extracted from $\|x^k - e^{j\phi_k}x^*\|$ has the minimum value" and replace with --where $T_{\phi_k}(\bar{x}^*)$ is extracted from $e^{j\phi_k}x^*$ such that $\|x^k - e^{j\phi_k}x^*\|$ has the minimum value--.

At Column 12, Line number 17, delete "guarantees $\|\bar{x}\|$ for all" and replace with --guarantees $\|\bar{x}\| < \infty$ for all--.

Signed and Sealed this
Thirty-first Day of March, 2020

Andrei Iancu
*Director of the United States Patent and Trademark Office*

At Column 12, Line number 35, equation 43, delete the portion of the equation reading "$L_i|i|$" and replace with --$L_i|t|$--.

At Column 12, Line number 49, equation 45, delete the portion of the equation reading "$(\bar{x} - te_i)$" and replace with --$(\bar{x} + te_i)$--.

At Column 12, Line number 56, equation 46, delete the portion of the equation reading "$(\bar{x} - te_i)$" and replace with --$(\bar{x} + te_i)$--.

At Column 13, Line number 6, equation 48, delete the portion of the equation reading "$(\bar{x} - te_i)$" and replace with --$(\bar{x} + te_i)$--.

At Column 13, Line number 15, equation 49, delete the portion of the equation reading "$(\bar{x} - te_i)$" and replace with --$(\bar{x} + te_i)$--.

At Column 13, Line number 15, equation 49, delete the portion of the equation reading "$(\bar{x} - \gamma te_i)$" and replace with --$(\bar{x} + \gamma te_i)$--.

At Column 13, Line number 17, equation 49, delete the portion of the equation reading "$(\bar{x} - \gamma te_i)$" and replace with --$(\bar{x} + \gamma te_i)$--.

At Column 13, Line number 42, equation 51, delete the portion of the equation reading "$\min f$" and replace with --$\min_{\alpha} f$--.

At Column 14, Line number 10, equation 54, delete the portion of the equation reading "$\nabla f_{i_k}$" and replace with --$\nabla f$--.

At Column 15, Line number 42, delete "projection of onto $\mathcal{P}$" and replace with --projection of $x^*$ onto $\mathcal{P}$--.

At Column 16, Line number 6, equation 67, delete the portion of the equation reading "$\langle \nabla f(\bar{x}^k), \bar{x}^* \rangle$" and replace with --$\langle \nabla f(\bar{x}^k), \bar{x}^k - T_{\phi_k}(\bar{x}^*) \rangle$--.

At Column 16, Line number 33, delete "It requires $\gamma > 0$" and replace with --It requires $\gamma_k > 0$--.

At Column 20, Line number 54, delete "API, in addition" and replace with --API. In addition--.

At Column 21, Line number 25, equation 75, delete the portion of the equation reading "$i_k = \arg\min_i |$" and replace with --$i_k = \arg\max_i |$--.

In the Claims

At Column 22, Claim number 4, Line number 58, delete the portion of the equation reading

CERTIFICATE OF CORRECTION (continued)
U.S. Pat. No. 10,437,560 B2

"$i_k = \arg\min_i |$" and replace with -- $i_k = \arg\max_i |$ --.

Column 23, Claim number 5, Line number 3, delete the portion or the equation reading "i≠k" and replace with --i≠$i_k$--.

At Column 24, Claim number 9, Line number 3, delete "receive user input comprising capture device input comprising" and replace with --receive user input comprising capture device, input comprising--.

At Column 24, Claim number 12, Line number 19, delete the portion of the equation reading "$i_k = \arg\min_i |$" and replace with -- $i_k = \arg\max_i |$ --.

At Column 24, Claim number 13, Line number 31, delete the portion of the equation reading "$2N-1\{x_i^k\}$" and replace with --$2N-1\{\bar{x}_i^k\}$--.